No. 649,099. Patented May 8, 1900.
M. BRUNER.
VEHICLE WHEEL.
(Application filed Mar. 6, 1900.)
(No Model.)
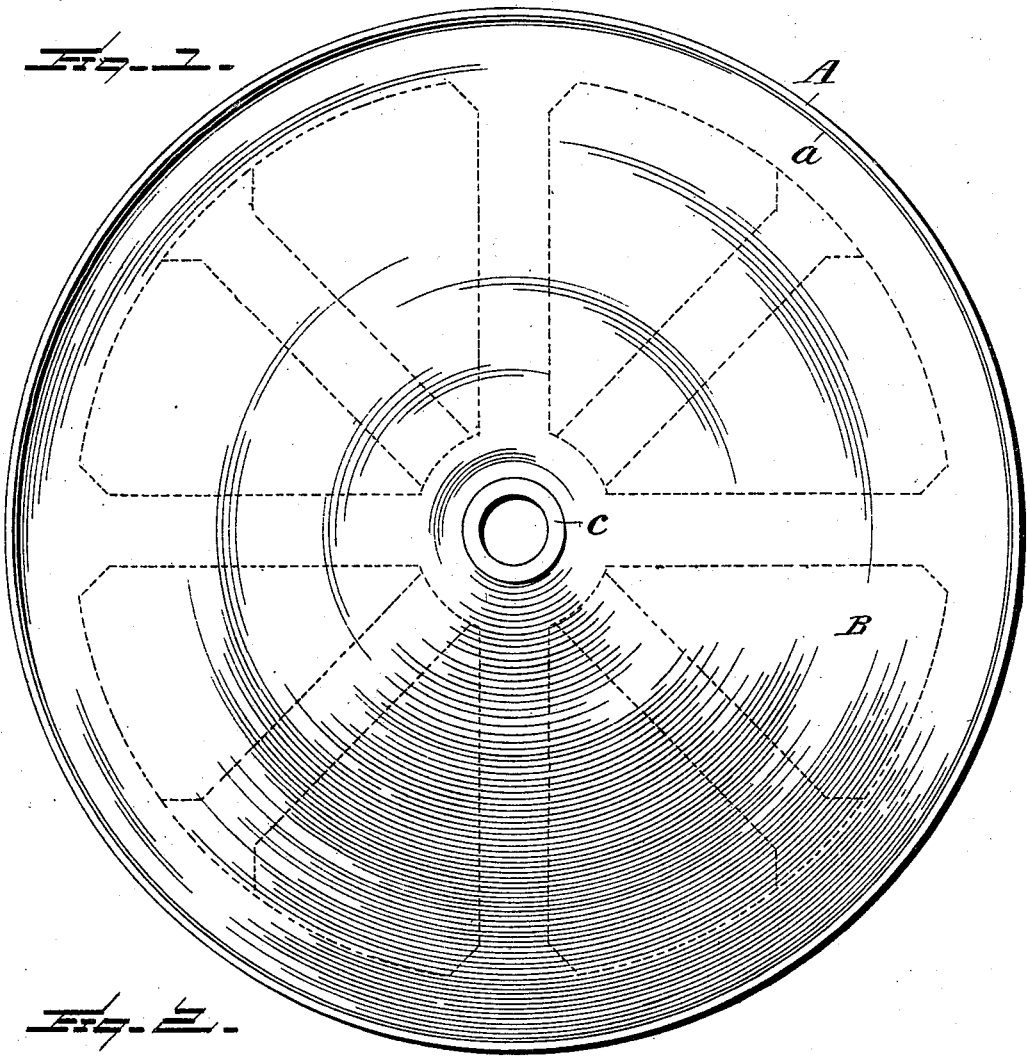
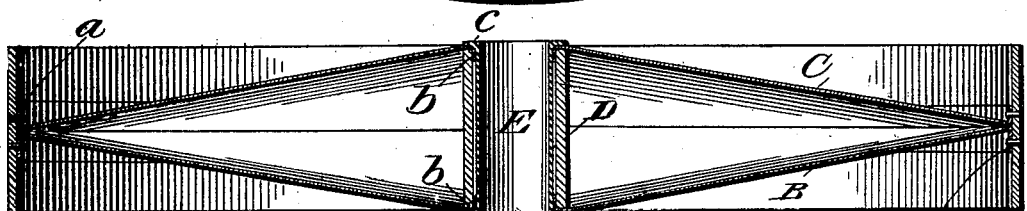
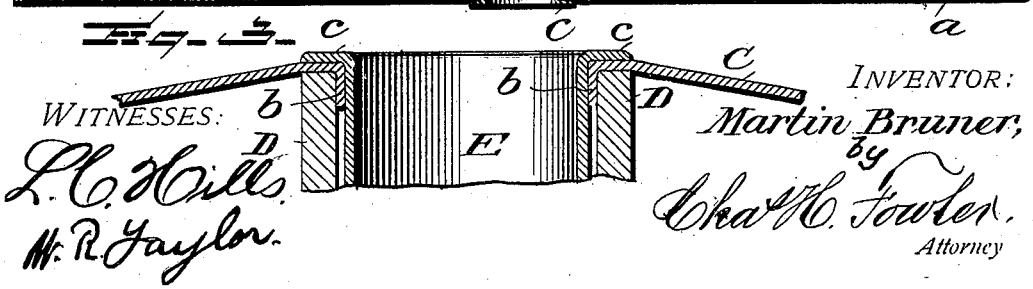
WITNESSES:
L. C. Hills
W. R. Taylor
INVENTOR:
Martin Bruner,
by
Chas. H. Fowler.
Attorney

UNITED STATES PATENT OFFICE.

MARTIN BRUNER, OF BUCKLAND, OHIO.

VEHICLE-WHEEL.

SPECIFICATION forming part of Letters Patent No. 649,099, dated May 8, 1900.

Application filed March 6, 1900. Serial No. 7,494. (No model.)

*To all whom it may concern:*

Be it known that I, MARTIN BRUNER, a citizen of the United States, residing at Buckland, in the county of Auglaize and State of Ohio, have invented certain new and useful Improvements in Vehicle-Wheels; and I do hereby declare that the following is a full, clear, and exact description of the same, reference being had to the annexed drawings, making a part of this specification, and to the letters of reference marked thereon.

The present invention has for its object to provide a vehicle-wheel wholly of metal that will be specially adapted to heavy wagons, such as farm-wagons or wagons for hauling heavy loads, and at the same time be simple in construction and possess the required durability and strength.

The invention consists in a vehicle-wheel constructed substantially as shown in the drawings and hereinafter described and claimed.

Figure 1 of the drawings is a side elevation of a wheel constructed in accordance with my invention, showing the position of the spokes in dotted lines when a spoke-wheel is used; Fig. 2, a central section through the wheel; Fig. 3, a detail sectional view, on an enlarged scale, of the hub or central portion of the wheel.

In the accompanying drawings, A represents the metal rim of the wheel, of any suitable thickness and width, as found most desirable, as would be required to the uses to which the wheel is to be applied.

The body of the wheel may be composed of two metal disks B C or in the form of radial spokes, as shown in dotted lines of Fig. 1, the flanged ends of the spokes being the same as in the two disks and connected to the hub of the wheel in the same manner, said disks being united at their outer periphery and uniformly separated as the disks approach the hub or central portion of the wheel. The disks B C at their outer edge have outwardly-extending circumferential flanges $a$, which come against the inner periphery of the rim A and are riveted or otherwise suitably secured thereto. These flanges $a$ not only form means for securing the disks B C to the rim A, but provide a reinforce to the rim to increase its strength and durability. The inner edge of the disks B C have inwardly-extending circumferential flanges $b$, which overlap the ends of a central hub D and are wedged against the same and held firmly in place by a tubular locking-cylinder E. This locking-cylinder is of such diameter with relation to the interior diameter of the hub D that when one end is inserted in the hub and driven to place the metal of the flanges $b$ will be jammed tightly against the interior surface of the hub, which will hold it tightly in place.

The tubular locking-cylinder E is formed with flanges $c$ at its ends to hold the same securely in place, one of said flanges being preferably formed previous to inserting the cylinder E in the hub D and the opposite flange formed by hammering the metal similar to riveting. This, however, is immaterial, and both flanges at the ends of the cylinder may be hammered out after the cylinder is in place.

The disks B C form together a closed hollow body to the wheel, as shown in Fig. 2 of the drawings.

If it is desired to decrease the weight of the wheel, the disks B C may be in the form of radial spokes, as indicated in dotted lines of Fig. 1, the same means being used to secure the spokes to the rim of the wheel and to the hub. The outwardly-extending flange $a$, which extends around the entire circumference of the disk, gives increased strength thereto at its outer edge and renders it more firm and rigid, and when taken together with its fellow disk provides a body to the wheel that will possess great strength and durability.

The cylinder E may be slightly tapering upon its interior or of any other shape to adapt it to the spindle of the axle.

Having now fully described my invention, what I claim as new, and desire to secure by Letters Patent, is—

A metal vehicle-wheel, comprising a suitable rim, two disks united at their outer peripheries and uniformly separated as they approach the hub, said disks having outwardly-extending flanges at their outer periphery for securing to the rim and at their inner peripheries inwardly-extending flanges to overlap the ends of the hub, and a tubular flanged locking cylinder extending into the hub and
5 holding the flanges of the disks tightly against the same, substantially as and for the purpose set forth.

In testimony that I claim the above I have hereunto subscribed my name in the presence of two witnesses.

MARTIN BRUNER.

Witnesses:
P. J. WALSHE,
L. C. HILLS.